United States Patent
Craig

[11] 3,930,423
[45] Jan. 6, 1976

[54] CONSTANT OIL LEVEL CONTROL FOR TRANSMISSION SUMP

[75] Inventor: James T. Craig, Indianapolis, Ind.

[73] Assignee: General Motors Corporation, Detroit, Mich.

[22] Filed: Nov. 29, 1974

[21] Appl. No.: 528,473

[52] U.S. Cl. .................. 74/732; 137/386; 137/413
[51] Int. Cl.² .. F16H 47/00; E03B 5/06; E03C 1/00; F16K 31/18
[58] Field of Search ............ 74/730, 731, 732, 733; 137/101.25, 101.27, 386, 413, 415

[56] References Cited
UNITED STATES PATENTS

| | | | |
|---|---|---|---|
| 2,568,506 | 9/1951 | Mercer | 137/413 |
| 2,570,451 | 10/1951 | Hottenroth | 137/386 X |
| 3,107,553 | 10/1963 | Tuck | 74/732 X |
| 3,144,056 | 8/1964 | Mosher | 137/413 X |
| 3,363,466 | 1/1968 | Guidi | 73/295 |
| 3,412,610 | 11/1968 | Prussin | 73/362 |
| 3,500,687 | 3/1970 | Smith | 73/295 |
| 3,524,523 | 8/1970 | Kilmex et al. | 74/732 X |
| 3,789,865 | 2/1974 | Borman | 137/413 X |

*Primary Examiner*—Samuel Scott
*Assistant Examiner*—Lance W. Chandler
*Attorney, Agent, or Firm*—A. M. Heiter

[57] ABSTRACT

A power shift transmission having a fluid pressure control system having an intake screen and level control located centrally in the bottom of the sump and a pump and regulator valve supplying pressure to the shift control system and to a sump oil level control. The sump oil level control has a small float controlling a relay valve to control an oil level control valve connecting an elevated oil reservoir for gravity feed to fill the sump and pressure return to the reservoir to dump the sump. When the transmission input and pump is not driven, there is no pressure in the chambers at opposite ends of the differential land area level valve and balanced springs hold the level valve in a central closed position blocking flow to and from the reservoir, to the sump and from the pressure line so the oil level control is inoperative. When the transmission input is driven, a small flow of line pressure is supplied through an inlet restriction to each chamber. When the oil level is low, a miniature float provides a small force to close the miniature relay valve closing a restricted exhaust from the chamber at the larger area land so equal pressures in the chambers act on the differential land area to move the level valve to the fill position closing the supply pressure port and providing a full flow connection from the reservoir for gravity feed at a low volume rate of flow to the sump. When the oil level is high the float permits the pressure to open the relay valve and the restricted exhaust reduces the pressure in the larger area chamber to move the level valve to dump position closing the sump port and connecting a restricted supply pressure branch to the reservoir so the transmission pump delivers fluid at the same low volume rate of flow from the sump to the reservoir to reduce the oil level. In a modification a level indicating thermistor controls a solenoid controlled relay valve similarly controlling the oil level valve.

6 Claims, 5 Drawing Figures

CONSTANT OIL LEVEL CONTROL FOR TRANSMISSION SUMP

BRIEF DESCRIPTION:

The level control system for a sump has an internal fluid pressure supply for the transmission shift and sump level control systems with an intake in the sump and an external fluid supply reservoir interconnected with the sump by a level control valve controlled by a very low flow and miniature force relay valve controlled by a miniature low force level sensor. The level control system is operative at low oil level to connect the reservoir to sump to increase the oil level and at high oil level to connect the internal fluid pressure supply to the reservoir to decrease the oil level. The transmission control system has an intake screen, an input drive pump and regulator valve means providing the internal fluid pressure supply. The regulator valve means regulates a supply pressure for the transmission control system and provides a fluid pressure supply for the sump level control system. The main line supply for the transmission controls is used to supply the leveling system for full time operation. An overage supply to the leveling system which is available except for short periods of maximum main line requirements for the transmission control will provide priority supply to the transmission controls and sufficient part time leveling operation. The external reservoir is elevated to provide a gravity feed.

The level control valve has spaced differential area lands mounted in a stepped bore which is closed at both ends to provide a valve control chamber at the opposite ends of the lands. When the engine is not driving the transmission input, the pump does not supply pressure to the transmission shift control system and the level control system. Then balanced springs, one at each end of the level control valve element hold the valve element in a central closed position blocking the feed port connected to the pressure supply, the sump port connected to the sump and blocking the fill and dump port connected to the reservoir. Each valve control chamber has a small restricted inlet connected to the internal fluid pressure supply. The valve control chamber adjacent the larger land has a level controlled relay valve controlling a small restricted exhaust operative when the oil level is low to close the exhaust and when the oil level is high to open the small restricted exhaust. The level controlled relay valve, since it only controls the miniature volume flow through the restricted exhaust, has very low force requirements and is controlled by a level sensor, a miniature float. In a modification a thermistor type fluid level sensor controls a solenoid type level controlled relay valve to similarly control the level control valve. When the oil level is low with the restricted exhaust closed, the equal pressure in the chambers provides a force acting on the unbalanced area of the larger land to move the level control valve element to fill position to open the sump port through the space between the lands to the fill and dump port to establish a low volume rate gravity feed from the reservoir to the sump. During fill operation the feed port remains closed. When the oil level is high with the restricted exhaust open, the pressure in the chamber adjacent the larger area land is reduced so the higher pressure in the chamber adjacent the small land moves the valve element in the opposite direction to the dump position opening the feed port so the transmission pump pumps fluid from the sump to provide the internal fluid pressure source which is connected to the fill and dump port to be dumped or returned to the reservoir to lower the oil level in the sump. During dumping operation the sump port is closed. The internal pressure supply to the feed port is restricted so return flow from the sump to the reservoir has the same low volume rate of flow as the gravity feed flow from the reservoir to the sump for control stability.

These and other features of the invention will be more apparent from the following drawings and description of a preferred embodiment.

Figure 1:
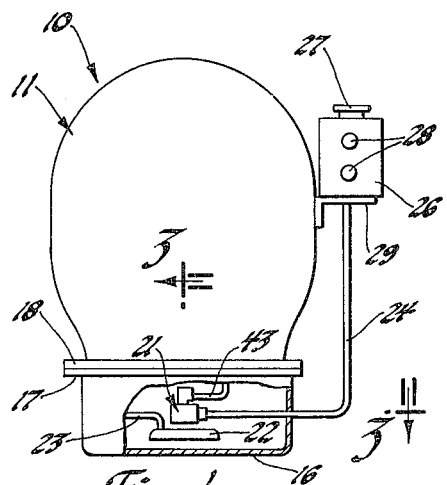
FIG. 1 is an end view of a transmission with parts broken away to show the sump oil level control system.
Figure 2:
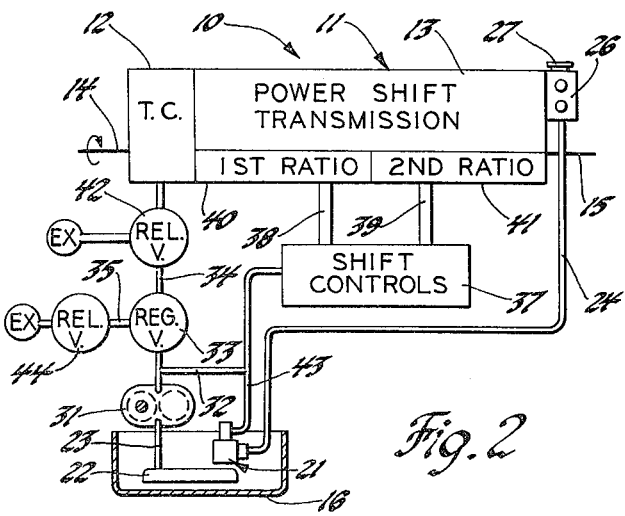
FIG. 2 is a schematic of the transmission control system with the sump oil level control system.

Referring to FIG. 1, the transmission 10 has a housing 11 for the transmission torque converter 12 and gearing 13 providing a variable ratio drive between the input shaft 14 and output shaft 15. The sump pan 16 has a flange 17 secured to the bottom flange 18 of the open bottom of the transmission housing 11. The oil level control device 21 is located centrally in the pan 16 above the intake screen 22 which is connected to the suction line 23. The level control device 21 is connected by the fill and dump line 24 to an elevated makeup oil reservoir or tank 26. The tank 26 has a cap 27 on the fill opening, an air vent in the cap or another suitable location and an oil level indicator 28 and is suitably mounted by a bracket 29 on the transmission or other part of the vehicle. The transmission control system has the screen 22 located centrally in the bottom of the pan 16. The intake screen is connected by the intake line 23 to the pump 31 which is conventionally driven by the transmission input shaft or drive member 14 and supplies fluid under pressure to the main line 32 which is regulated by the conventional main line regulator valve 33 with excess fluid connected by the first overage or converter feed line 34 and by the second overage line or exhaust line 35. The main line 32 pressure is conventionally connected to the shift controls 37 which selectively supply a plurality of ratio establishing lines 38 and 39 connected respectively to the ratio establishing devices 40 and 41, e.g., for a first and second ratio. The converter feed line 34 has an intermediate pressure relief valve 42 to insure that converter feed pressure is limited to an intermediate value, less than main line pressure, and is connected to supply the torque converter. The exhaust line 35 when restricted to provide a secondary overage fluid supply has a low pressure relief valve 44. The regulated main line 32 is shown connected to the feed line 43 for the level control device 21 to provide a fluid supply for full time operation of the leveling system when the vehicle engine is operating. The transmission fluid level system feed line 43 may be alternatively connected to the converter feed line for a first overage fluid supply to the leveling system to provide operation of the leveling system when the main line requirements are supplied and there is sufficient overage to provide an intermediate pressure feed to the torque converter and to the leveling system. The leveling system feed line 43 may be alternatively connected to the exhaust line 35 so all fluid supply requirements of the transmission are met and then second overage fluid supply is fed to the leveling system. While full time main line supply and operation of the leveling system is desirable for the leveling system operation, the above first and second overage arrangements may be desirable for the overall transmission operation. Transmissions have varying amounts of excess main line capacity and varying amounts of first and second overage flow during varying time periods. In transmissions that do not have excess main line capacity, the leveling system can function on a part time basis when first or second overage feed is available to provide priority supply to the transmission control to insure full time transmission operation.

Figure 3:
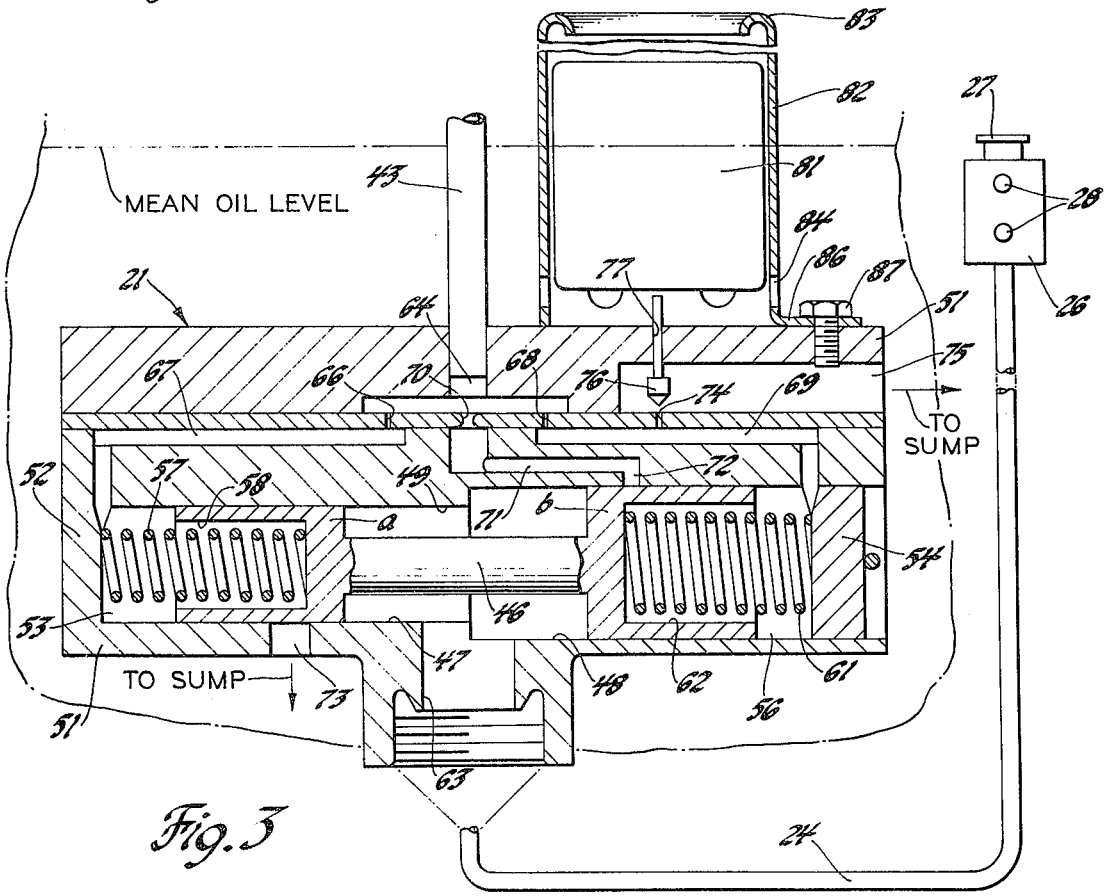
FIG. 3 is a right angle sectional view on the line 3—3 FIG. 1 showing the leveling valve and float details.

The level control device 21, as shown in FIG. 3, has a valve element 46 having a small land a and a large land b respectively mounted in the small bore portion 47 and the large bore portion 48 of the stepped valve bore 49 in the valve body 51. The bore 49 has at the small end a closure wall 52 providing a fluid pressure chamber 53 between this wall and the land a and a removable closure wall 54 at the large end of the bore providing a fluid pressure chamber 56 between the wall 54 and land b of the valve element. A spring 57 seated on the wall 52 fits in a guide bore 58 in the land a and engages the land a to move the valve element 46 in a dump opening direction. A spring 61 fits in bore 62 in the end land b to bias the valve element 46 in fill opening direction. The fill and dump line 24 is connected at port 63 to the stepped bore 49 at the step and thus is always connected to the space between the lands a and b of valve element 46. A main line 43 is connected to a main line port 64 which is connected by restriction 66 and passage 67 to chamber 53 and by restriction 68 and passage 69 to chamber 56. The entry of passages 67 and 69 respectively to chambers 53 and 56 has a recess so valve element 46 cannot block the passages so each passage provides for full flow downstream of its restriction. The restrictions 66 and 68 provide equal flow and the chambers 53 and 56 have about equal volume so fluid movement during operation is about equal. The main line 43 is also connected by a restriction 70 and feed passage 71 to feed port 72 which may be annular in the large portion 48 of the bore. The small bore portion 47 has a fill port 73 connected to sump 16. When the valve 46 is in the neutral position shown, both the feed port 72 and the exhaust port 73 are closed respectively by the lands b and a. The control passage 69 is also connected by the valve controlled restricted passage 74 to exhaust 75 and is opened and closed by the relay valve element 76 slidably mounted in bore 77 in a portion of the valve body 51. A miniature cylindrical float 81 is mounted in a cylindrical guide 82 having an inturned flange 83 at the top to retain the float within the guide, apertures 84 around the bottom of the float and attachment ears 86 and retaining screws 87.

Figure 4:
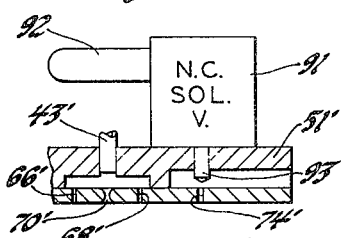
FIG. 4 is a partial view of a portion of the level control valve showing a thermistor controlled solenoid type level controlled valve.
Figure 5:
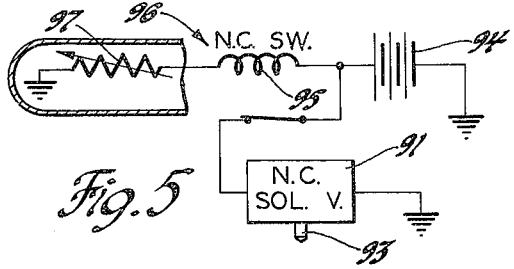
FIG. 5 is a schematic diagram of the thermistor and solenoid type level controlling valve.

The level sensor in the modification shown in FIGS. 4 and 5 employs a normally closed solenoid valve 91 and a temperature sensitive resistor or thermistor probe 92. The solenoid valve 91 is secured on the valve body 51' which is like valve body 51 of FIG. 3 so only a portion is shown. The solenoid valve 91 has a valve element 93 which is spring biased to close restriction 74' and has a coil which when electrically energized opens restriction 74'. The thermistor probe 92 has a thermistor, e.g., a semiconductive germanium material of P-type conductivity or silicon material of N-type conductivity, having in the operating range a negative temperature coefficient of resistance providing as the temperature of the thermistor gradually increases, the resistance of the thermistor rapidly decreases, and conversely, as the temperature of the thermistor decreases, the resistance of the thermistor rapidly increases.

Such thermistors are used as fluid level sensors. The thermistor is supplied with proper voltage and when the heat generated by the resistance of the thermistor is dissipated to surrounding fluid, the thermistor is maintained at a lower temperature providing high resistance and low current flow insufficient to actuate a relay switch but when the heat generated by the resistance of the thermistor is not dissipated because it is surrounded by air, the temperature rises to reduce resistance and increase current flow sufficient to actuate a relay switch.

The level sensor circuit has a source of electrical energy, e.g., grounded battery 94, which is connected through the coil 95 of the normally closed relay switch 96 to the grounded thermistor 97 of the above described type in probe 92. The normally closed switch 96 normally connects the battery to energize the solenoid valve 91 to open valve 93 and when switch 96 is energized, opens the circuit to de-energize the solenoid valve to close valve 93.

When the fluid level is above the probe 92, the thermistor 97 reduces current, normally closed switch 96 is closed to energize solenoid valve 91 to open relay valve element 93 to cause the level valve to return or dump fluid from sump 16 to reservoir 26. When the fluid level is below the probe 92, the thermistor 97 increases current, normally closed switch 96 is open to de-energize normally closed solenoid valve 91 so the spring closes valve element 93 to cause the level valve to fill the sump 16 from the reservoir.

OPERATION:

During operation of a transmission in a vehicle the level of the oil in the sump of the transmission is subject to wide variations caused by variations in temperature, vehicle attitude, transmission operation conditions and loss of oil. In order to maintain substantially normal oil level in the transmission sump, the transmission oil level control device 21 is centrally located in the transmission sump pan 16 and has a miniature float 81 controlling a valve 46 which is operative in response to low oil level to provide a fill connection to admit additional oil from the elevated tank 26 under a gravity feed and in response to above normal oil level connects the main line dump branch through the oil level control valve to return or dump oil to the elevated tank 26 to reduce the oil level.

When the transmission is not operating, and the transmission pump is not supplying fluid under pressure to the supply line such as main line 32, the springs 57 and 61 acting on opposite ends of the valve element 46, position the valve element in the central position shown. In this position main line pressure dump feed line 43 is blocked at port 72 by the land b of valve element 46. The fill port 73 is blocked by the land a of valve element 46. Thus the fill and dump line 24 is blocked between the lands a and b and there is no fill flow from the tank 26 through line 24 to the transmission sump and no dump flow from the dump feed line 43 to the fill and empty line 24. When the transmission input is driven to drive pump 31, the main line pressure is supplied from the sump 16 to the main line pressure line 32 and regulated by the regulator valve 33. This main line pressure is connected to the dump and control line 43 and is initially supplied respectively through orifices 66 and 68, passages 67 and 69 to chambers 53 and 56. If the oil level is low and the float 81 descends to move relay valve 76 to the closed position closing orifice 74, the main line pressure in both chambers 53 and 56 is equal. Thus the main line pressure chamber 56 acting on the larger area of land *b* moves the valve element 46 in a fill opening direction to connect the tank 26 via fill and dump line 24 and its port 63 between the lands a and b to the fill port 73 to deliver more oil to the sump to increase the oil level in the sump. If the oil level rises above the normal oil level, it raises the float 81 to permit the pressure in passage 69 to move the relay valve 76 to open the passage 74 to connect the main line passage 69 via restriction 74 to exhaust port 75 to lower the pressure in chamber 56 so the equalized spring force and main line pressure in chamber 53 will move the valve element 46 to the dump opened position connecting main line pressure from dump feed line 43, restriction 70, passage 71 and port 72 between the lands a and b to port 63 and its fill and dump line 24 to return or dump fluid to the tank 26 to lower the oil level in the sump. The restriction 70 in the main line pressure supply reduces the return or dump fluid flow to the same rate of flow volume as the gravity feed from the reservoir to the sump to equalize valve cycle time. This level control provides a slow rate of change between limits closely above and below the indicated means oil level since the restrictions 66, 68 and the forces on the float dump valve movement. The supply pressure is connected in parallel to the same very small size control restrictions 66 and 68 and the larger feed or supply restriction 70 so the rate of operation of the controls is the same in the dump and fill positions of valve element 46. The restriction 74 can be the same small size as restrictions 66, 68 to provide one half the supply pressure value in chamber 56 when relay valve 76 is open or slightly larger to provide less than half the supply pressure in chamber 56. Apertures 84 are small so oil surges do not immediately change float level to damp operation.

The solenoid valve 91 and thermistor probe 92 function to control relay valve element 93 as described above. The level valve body 51' functions in the same way under control of relay valve element 93 as the level valve body 51 under the control of relay valve element 76.

It will be apparent that these and other modifications of the invention may be made.

It is claimed:

1. In a transmission; a transmission housing having a sump; an input; and output; drive means in said housing receiving fluid under pressure during operation providing a drive between said input and output; a suction intake centrally located in the bottom of said sump; source means including a pump connected to said intake and delivering a regulated pressure to said drive means; a fluid reservoir elevated above said sump; level control valve means having a bore and level valve element means in the bore mounted for movement from a central closed position in one direction to a fill position and in the opposite direction to a dump position; a fill and dump passage connecting said reservoir to said bore; a fill passage connecting said bore to said sump for full gravity flow filling; supply passage means having a flow passage connecting said source means to said large bore portion for dumping control means for said level valve means, having a chamber and low flow restricted passage means connected to said chamber, control passage means having a low flow control restriction connecting said chamber to said sump and a relay valve element movable for closing said control passage means at said restriction by a very low force and biased to open position by fluid pressure in said large chamber and level sensor means operative in high fluid level condition to cause opening of said relay valve element to reduce pressure in said chamber and said control means to move said level valve element to said dump position connecting said supply passage to said fill and empty passage and closing said fill passage to pump fluid from said sump and supply passage to said reservoir and in a low fluid level condition to move said relay valve element to closed position to close said control passage means so pressure in said chamber moves said level valve element to fill position closing said supply passage and connecting said fill and empty passage to said fill passage to fill said sump from said reservoir.

2. The invention defined in claim 1 and said level sensor means being a miniature float operative to control said very low force relay valve element.

3. The invention defined in claim 1 and said level sensor being a solenoid operative to control said very low force relay valve element and thermistor means operative to control said solenoid.

4. In a transmission; a transmission housing having a sump; an input; an output; drive means in said housing receiving fluid under pressure during operation providing a drive between said input and output; a suction intake centrally located in the bottom of said sump; source means including a pump connected to said intake and delivering a regulated pressure to said drive means; a fluid reservoir elevated above said sump; level control valve means having a stepped bore having a large portion and a small portion with an intermediate step and closed at both ends, a level valve element having a large land in the large bore portion and a small land in the small bore portion with a recess therebetween at the step slidably mounted in said stepped bore for movement from a central closed position in one direction to a fill position and in the opposite direction to a dump position, a small area chamber provided between the closed small bore end and said small land, a large area chamber provided between the closed large bore end and said large land and spring means in each chamber seated on an end wall and biasing said valve element to said central closed position; a fill and dump passage connecting said reservoir to said bore at said step for connection to said recess in all valve element positions; a large fill passage connecting said small bore portion to said sump for full gravity flow filling; supply passage means having a restricted flow passage connecting said source means to said large bore portion for restricted pressure flow dumping at about the same volume rate of flow as said full gravity flow, a first very low flow restricted passage connecting said source means to said small chamber and a second very low flow restricted passage having substantially the same flow restriction as said first restricted passage connected to said large chamber; control passage means having a very low flow control restriction and connecting said large chamber to said sump, a miniature relay valve element movable for closing said control passage means at said control restriction and biased to open position by fluid pressure in said large chamber; a miniature float guided for floating on the fluid in said sump operative in high fluid level position to permit pressure in said large chamber to open said relay valve element to reduce pressure in said large chamber so pressure in said small chamber moves said level valve element to said dump position connecting said supply passage to said fill and empty passage and closing said fill passage to pump fluid from said sump to said reservoir and in a low fluid level position to move said relay valve element to closed position to close said control passage means so full pressure in said large chamber moves said level valve element to fill position closing said supply passage and connecting said fill and empty passage to said fill passage to fill said sump from said reservoir.

5. The invention defined in claim 4 and said source means having a main line at main line regulated pressure connected to said drive means and said supply passage means.

6. The invention defined in claim 4 and said source means having a main line at main line regulated pressure connected to said drive means and an overage line at a lower regulated pressure connected to said supply passage means to provide priority for drive means operation.

* * * * *

UNITED STATES PATENT AND TRADEMARK OFFICE
CERTIFICATE OF CORRECTION

PATENT NO. : 3,930,423

DATED : January 6, 1976

INVENTOR(S) : James T. Craig

It is certified that error appears in the above-identified patent and that said Letters Patent are hereby corrected as shown below:

Column 4, line 45, "operation" should read -- operating --;

Column 5, line 35, "dump" should read -- damp --;

Column 5, line 57, "and" should read -- an --.

Signed and Sealed this fifteenth Day of June 1976

[SEAL]

Attest:

RUTH C. MASON
Attesting Officer

C. MARSHALL DANN
Commissioner of Patents and Trademarks